United States Patent
Bryan

(10) Patent No.: US 7,017,698 B2
(45) Date of Patent: Mar. 28, 2006

(54) MOTORCYCLE WITH DUAL DRIVE CHAINS

(75) Inventor: Joshua S. Bryan, Boring, OR (US)

(73) Assignee: MotoCzysz LLC, Portland, OR (US)

( * ) Notice: Subject to any disclaimer, the term of this patent is extended or adjusted under 35 U.S.C. 154(b) by 0 days.

(21) Appl. No.: 10/704,929

(22) Filed: Nov. 10, 2003

(65) Prior Publication Data

US 2005/0098370 A1    May 12, 2005

(51) Int. Cl.
*B62K 19/30*    (2006.01)

(52) U.S. Cl. .................. 180/231; 180/205; 180/366; 474/84

(58) Field of Classification Search ............. 180/219, 180/205, 231, 337, 366; 280/261; 474/84, 474/85, 95, 97; 301/6.1, 6.5, 6.9, 105.1, 301/110.5
See application file for complete search history.

(56) References Cited

U.S. PATENT DOCUMENTS

| | | | | |
|---|---|---|---|---|
| 528,145 A | * | 10/1894 | Carr | ........................ 474/84 |
| 2,630,348 A | * | 3/1953 | Schuricht | ................. 301/6.5 |
| 3,891,235 A | * | 6/1975 | Shelly | .................... 280/252 |
| 3,926,020 A | * | 12/1975 | Dantowitz et al. | ............ 474/11 |
| 4,003,443 A | * | 1/1977 | Boughers | ................... 180/217 |
| 4,301,885 A | * | 11/1981 | Kostron | ..................... 180/205 |
| 4,398,740 A | * | 8/1983 | Clem | ........................ 280/261 |
| 4,410,060 A | * | 10/1983 | Cunard | ..................... 180/205 |
| 5,533,741 A | * | 7/1996 | Matsuo | ..................... 280/238 |
| 6,267,701 B1 | * | 7/2001 | Mott | ......................... 474/164 |
| 6,736,464 B1 | * | 5/2004 | Pidoux | .................... 301/110.5 |
| 2003/0006080 A1 | * | 1/2003 | Buell et al. | ................. 180/225 |
| 2004/0144584 A1 | * | 7/2004 | Phillips et al. | .............. 180/205 |

FOREIGN PATENT DOCUMENTS

GB          2290507 A    *    1/1996

* cited by examiner

*Primary Examiner*—Lesley D. Morris
*Assistant Examiner*—Daniel Yeagley
(74) *Attorney, Agent, or Firm*—Richard Calderwood

(57) ABSTRACT

A motorcycle having two drive chains. The gearbox output includes a left front sprocket and a right front sprocket. The rear wheel includes a left rear sprocket and a right rear sprocket. Left and right chains connect the respective front and rear sprockets. Power is transmitted to the rear wheel symmetrically. The swingarm is not subjected to asymmetric force that would twist it or pull it to one side, and can be made lighter. Swingarm flex can be better specified, making the swingarm a more useful suspension component, especially aiding the rear wheel while bent over in hard cornering over an irregular road surface.

14 Claims, 3 Drawing Sheets

MOTORCYCLE WITH DUAL DRIVE CHAINS

BACKGROUND OF THE INVENTION

1. Technical Field of the Invention

This invention relates generally to motorcycles, and more specifically to final drive chain solutions for them.

2. Background Art

FIG. 1 illustrates a conventional motorcycle 10 including a frame 12 holding an engine 14 which includes a gearbox 16. The final output of the gearbox is a shaft 18 to which is coupled a front sprocket 20. The front sprocket drives a chain 22, which in turn drives a rear sprocket 24 which is coupled to a rear wheel 26. The rear wheel is pivotably coupled to the frame or to the engine by a swingarm 28. A shock/spring unit 30 supports the frame or engine on the swingarm.

Under acceleration, the engine is supplying tremendous torque through the front sprocket, and the top segment 22T of the chain is under an extraordinary amount of strain, while the bottom segment 22B of the chain is relatively slack. Because the chain is located to one side of the rear wheel, and thus closer to one side of the swingarm (the right side, as illustrated) than to the other side (Where the brake rotor is located), the pulling force of the top segment of the chain applies a very asymmetric load on the swingarm, tending to pull it rather strongly toward the chain side.

In order to avoid undesirable twisting and lateral flexing of the swingarm, the swingarm is made stronger, taller, thicker, and heavier. This increased mass reduces the acceleration of the motorcycle, reduces the ability of the rear wheel to track over bumps, and decreases the performance of the rear shock. Additionally, because the suspension components of the motorcycle are oriented in a substantially planar orientation with regard to the vertical, longitudinal plane of the motorcycle (i.e. the plane of the paper in FIG. 1), and because motorcycles lean significantly over on their sides when cornering, during cornering the suspension components are not in an orientation conducive to tracking vertical bumps and irregularities in the road surface. A significant fraction of the motorcycle rear end's vertical tracking in corners should, ideally, be provided by flex in the swingarm itself. Unfortunately, this is directly at odds with the need to stiffen the swingarm enough to avoid chain-induced flex and twist.

What is needed, then, is an improved motorcycle which has a rear end in which the swingarm can be more readily utilized and tuned as a meaningful lateral suspension component.

BRIEF DESCRIPTION OF THE DRAWINGS

The invention will be understood more fully from the detailed description given below and from the accompanying drawings of embodiments of the invention Which, however, should not be taken to limit the invention to the specific embodiments described, but are for explanation and understanding only.

DETAILED DESCRIPTION

Figure 1:
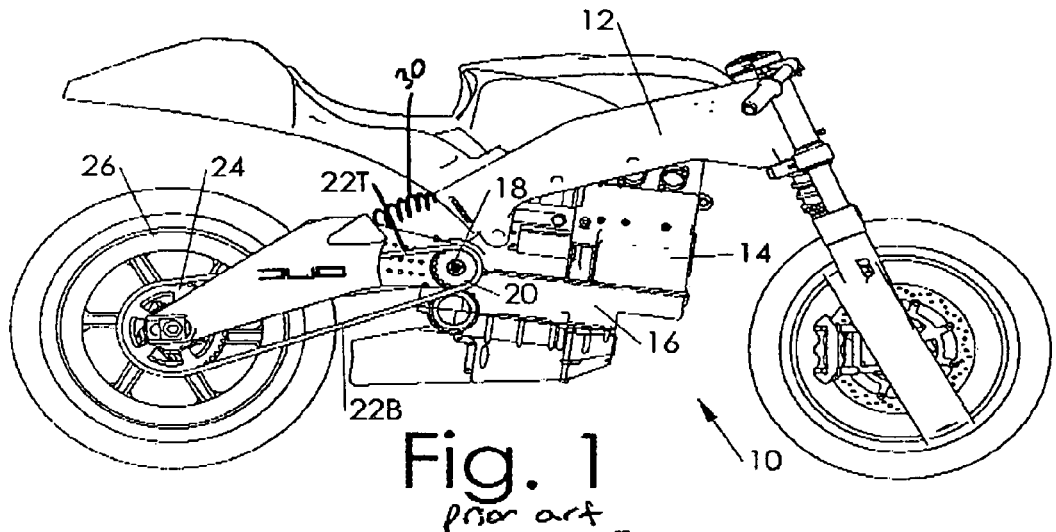
FIG. 1 shows, in side view, a conventional motorcycle having a single chain on one side of its rear wheel.
Figure 2:
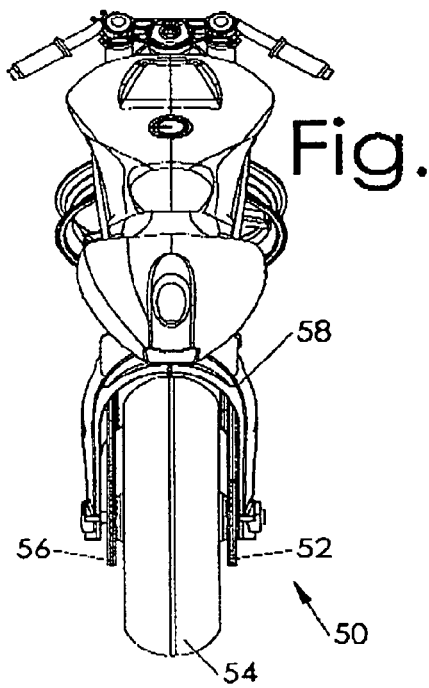
FIG. 2 shows, in rear view, a motorcycle having dual rear chains, one on each side of the rear wheel.

FIG. 2 illustrates one embodiment of a motorcycle 50 according to this invention. The motorcycle includes a right side chain 52 on a right side of the rear wheel assembly 54, and a left side chain 56 on a left side of the rear wheel assembly. The swingarm 58 is adapted to accommodate the dual chains.

Figure 3:
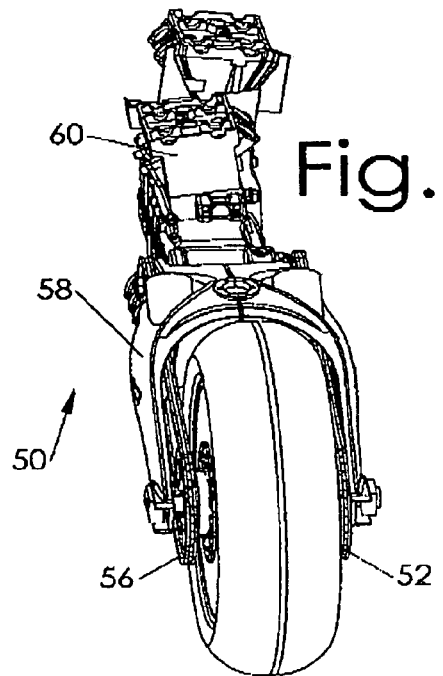
FIG. 3 shows, in rear view, a portion of such a motorcycle, omitting the frame, seat, tail, tank, and front end, for visibility's sake.

FIG. 3 illustrates a subset of the motorcycle 50 including an engine and gearbox assembly 60 which is adapted (not shown) to simultaneously drive both chains 52, 56. In one embodiment, the gearbox includes a single output shaft which extends beyond both sides of the gearbox, for coupling to the left and right front sprockets. In another embodiment, the gearbox includes separate left and right output shafts.

Figure 4:
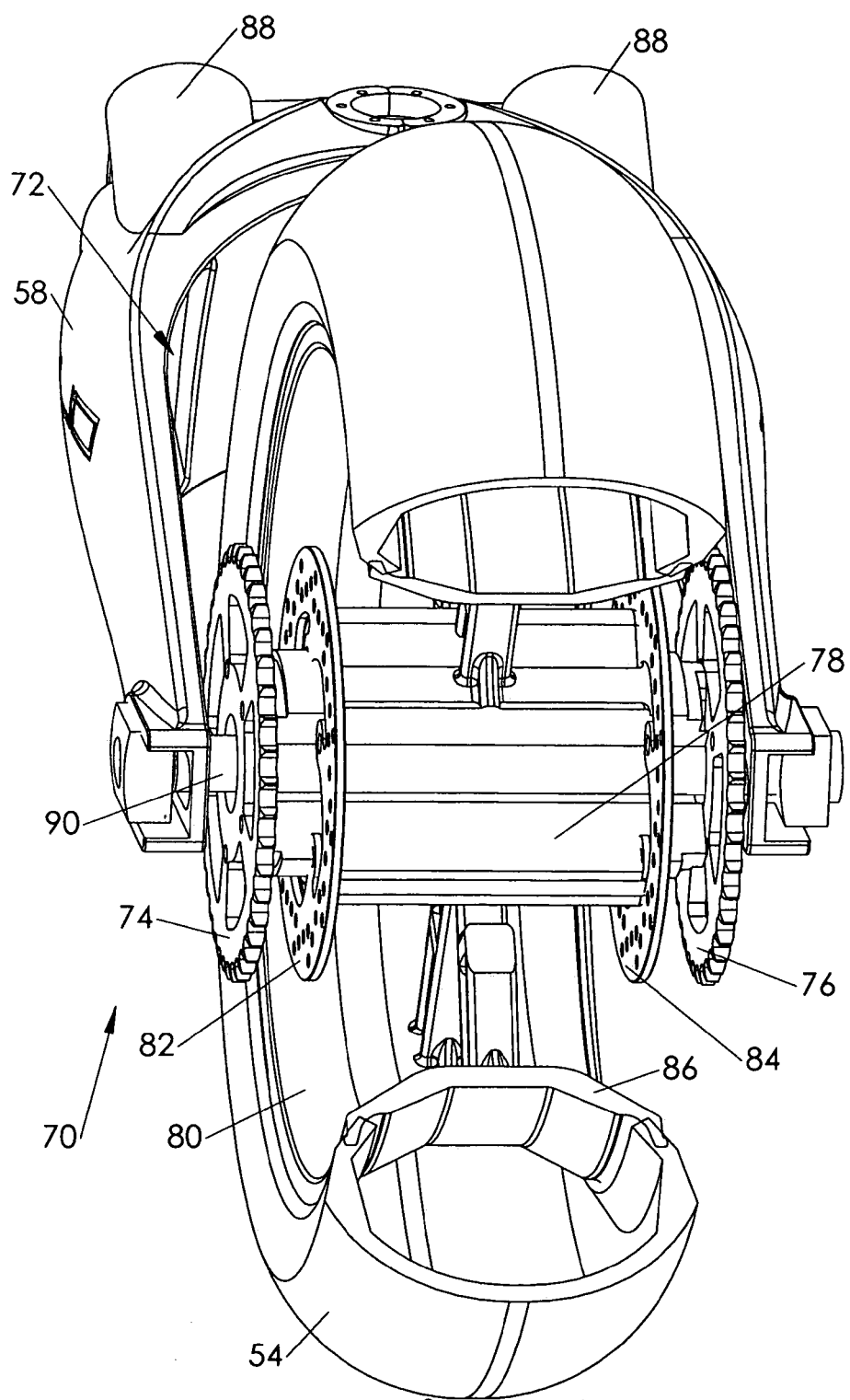
FIG. 4 shows, in rear view with a partial cutaway, a motorcycle rear end according to one embodiment of this invention.

FIG. 4 illustrates in closer detail the rear end assembly 70 which may be utilized in such a motorcycle. The rear end includes a swingarm 58 which accommodates dual chains, such as by including holes 72 on either side through which the upper segment of the chain (not shown) passes in its course from the dual front sprockets (not shown) to the dual rear sprockets 74, 76. The rear sprockets are coupled to a hub 78 of the rear wheel 80. Optionally, one or both sides of the hub may also be equipped with brake rotors 82, 84. Optionally, a brake rotor may instead, or also, be coupled to the rim 86 of the wheel. Brake calipers are not shown, as their mounting will be well understood by the skilled designer in light of the teachings of this disclosure. The swingarm includes one or more mounts 88 for the rear shock, and mounts (not visible) for rotatably coupling to the frame or engine. The rear wheel is coupled to the swingarm by an axle 90.

In one embodiment, the teeth of the left and right rear sprockets may be aligned at same angular positions, as shown. In another embodiment, the teeth of the left and right rear sprockets may be differently aligned, such as if they are one half tooth offset from each other, such that they engage their respective chain rollers at different times; this may in some instances reduce vibration or harmonic effects transmitted to and through the swingarm. In some embodiments, the left and right chains may be identical. In other embodiments, the chains may, for example, be of different pitch, such as a 520 chain and a 428 chain; the mechanic may choose this setup if, for example, two 428 chains would not together be strong enough, but two 520 chains would together be more than sufficiently strong and too heavy.

Similarly, it is not necessarily the case that both sprockets be identical. In some embodiments, the mechanic may choose to set up the motorcycle with a 16:48 sprocket combination on the left side, and a 15:45 sprocket combination on the right side (with both sides having a 1:3 sprocket ratio).

Although the rear end is illustrated with the sprockets being in mirror-image identical locations with respect to the central plane of the rear wheel, in other embodiments they may be at different locations. In some embodiments, it may be desirable or acceptable to use one or both rear sprockets as brake rotors, by mounting brake calipers over them and their chains, as long as the brake system can handle the chain lubrication which would tend to contaminate the pads, calipers, and rotors/sprockets.

Figure 5:
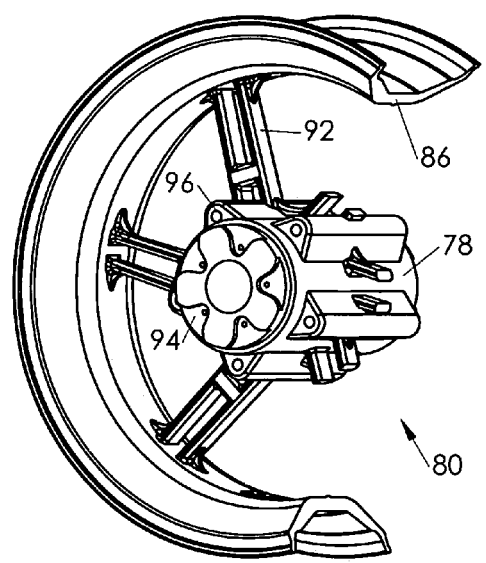
FIGS. 5 and 6 show one embodiment of a rear wheel such as may be utilized in the motorcycle rear end.
Figure 6:
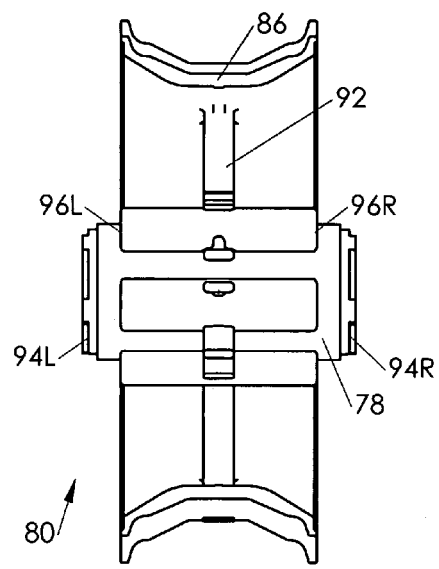

FIGS. 5 and 6 illustrate one embodiment of a rear wheel 80 according to this invention, in a perspective view and a radial view, shown with a portion of the rim 86 cut away for better visibility of the more pertinent components. The wheel includes a hub 78 connected to the rim, such as by spokes 92. The hub includes mounts 94 for left and right sprockets (not shown), including a left sprocket mount 94L and a right sprocket mount 94R. In one embodiment, the sprocket mounts simply comprise the machined ends of the hub, including threaded holes for accepting sprocket mounting bolts (not shown) or, alternatively, protruding captive sprocket mounting bolts (not shown). The hub end faces may optionally also have a contoured face formed to mate with the sprockets in a positive engagement, such as with the five-sided protrusion shown.

The hub may optionally include brake rotor mounts 96, including a left rotor mount 96L and/or a right rotor mount 96R. In one embodiment, the rotor mounts comprise extrusions extending radially outward from the central body of the hub, as shown. In one embodiment, the rotor mounting surfaces are offset inward from the sprocket mounting surfaces. The rotor mounts may include threaded holes for accepting rotor mounting bolts (not shown), or other suitable coupling means.

Figure 7:
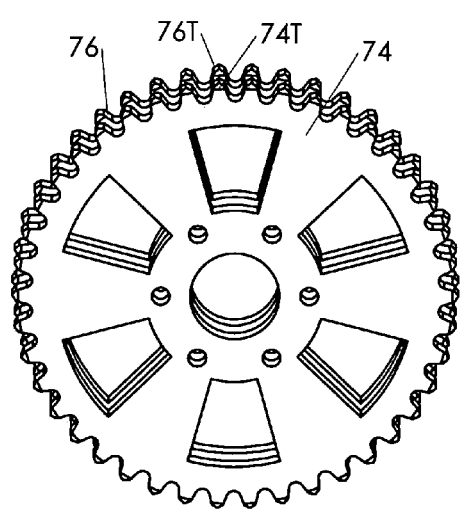
FIGS. 7 and 8 show the dual sprockets in in-phase and out-of-phase rotational alignment, respectively.

FIG. 7 illustrates the dual rear sprockets in an in-phase alignment. The teeth 74T of the left rear sprocket 74 and the teeth 76T of the right rear sprocket 76 are aligned in a same rotational position, such that the left and right teeth will engage the rollers of their respective chains (not shown) at the same time.

Figure 8:
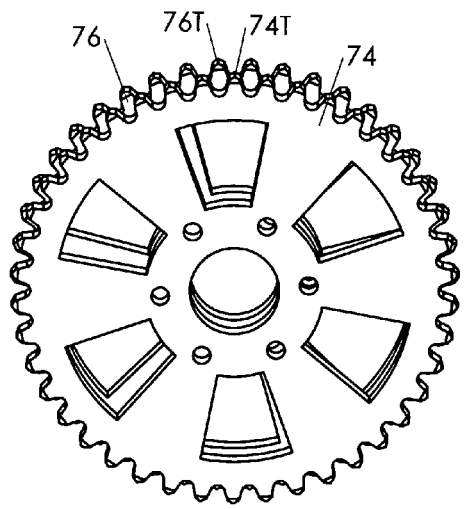

FIG. 8 illustrates the dual rear sprockets in an out-of-phase alignment. The sprockets are in different rotational alignments, such that the left rear sprocket's teeth 74T and the right rear sprocket's teeth 76T will engage the rollers of their respective chains at different times. The sprockets are shown one half tooth out of phase. The front sprockets (not shown) will generally need to be similarly out of phase.

CONCLUSION

While the invention has been illustrated with reference to chains, it could equally well be applied to belt-driven motorcycles, or to a motorcycle having a belt drive on one side and a chain drive on the other side. Belts are generally referred to as running on pulleys (either toothed or smooth), while chains are generally referred to as running on sprockets. Pulleys and sprockets are generically "wheels"; however, to avoid confusion with the word "wheel" being a specific reference to the wheel upon which the tire is mounted, I will use the term "sprocket" to generically refer to either sprockets or pulleys. I will use the term "drive sprocket" to refer to the sprocket which is powered by the gearbox (the "front sprocket" in common usage), and the term "driven sprocket" to refer to the sprocket which is coupled to the rear wheel (the "rear sprocket" in common usage). I will use the term "flexible band" to generically refer to either a chain or a belt which connects a driven sprocket to a drive sprocket.

When one component is said to be "adjacent" another component, it should not be interpreted to mean that there is absolutely nothing between the two components, only that they are in the order indicated.

The various features illustrated in the figures may be combined in many ways, and should not be interpreted as though limited to the specific embodiments in which they were explained and shown.

Those skilled in the art having the benefit of this disclosure will appreciate that many other variations from the foregoing description and drawings may be made within the scope of the present invention. Indeed, the invention is not limited to the details described above. Rather, it is the following claims including any amendments thereto that define the scope of the invention.

What is claimed is:

1. A motorcycle comprising:
a frame;
an engine coupled to the frame and including a gearbox;
a left drive sprocket coupled to the gearbox at a left side of the motorcycle;
a right drive sprocket coupled to the gearbox at a right side of the motorcycle;
a laterally flexible swingarm coupled to one of the frame and the engine;
a rear wheel coupled to the swingarm;
a left driven sprocket coupled to the rear wheel at the left side of the motorcycle;
a right driven sprocket coupled to the rear wheel at the right side of the motorcycle;
a left chain coupling the left drive sprocket to the left driven sprocket; and
a right chain coupling the right drive sprocket to the right driven sprocket;
whereby chain-induced twist of the swingarm is reduced; and wherein
the left chain passes through a hole extending through a left side of the swingarm; and
the right chain passes through a hole extending through a right side of the swingarm.

2. A motorcycle comprising:
a frame;
an engine coupled to the frame and including a gearbox driven by the engine;
a left drive sprocket coupled to a left side of the gearbox;
a right drive sprocket coupled to a right side of the gearbox;
a swingarm pivotably coupled to one of the frame and the engine;
a rear wheel coupled to the swingarm;
a left driven sprocket coupled to the rear wheel;
a right driven sprocket coupled to the rear wheel; and
a left flexible band counted to the left drive sprocket and the left driven sprocket; and
a right flexible band coupled to the right drive sprocket and the right driven sprocket;
wherein the left and right flexible bands pass through respective holes extending through the swingarm.

3. The motorcycle of claim 2 wherein:
the left and right flexible bands comprise belts.

4. The motorcycle of claim 2 wherein:
one of the left and right flexible bands comprises a chain, and the other comprises a belt.

5. The motorcycle of claim 2 wherein:
the left and right driven sprockets have a same radial size.

6. The motorcycle of claim 2 wherein:
the left and right driven sprockets have a same gauge size.

7. The motorcycle of claim 2 further comprising:
a first brake rotor coupled to a first side of the rear wheel.

8. The motorcycle of claim 7 further comprising:
a second brake rotor coupled to a second side of the rear wheel.

9. The motorcycle of claim 7 wherein:

the first brake rotor is coupled to a hub of the rear wheel.

10. The motorcycle of claim 2 wherein:

the left and right driven sprockets comprise left and right rear sprockets; and the left and right rear sprockets have their teeth at a substantially same rotational position.

11. The motorcycle of claim 2 wherein:

the left and right driven sprockets comprise left and right rear sprockets; and the left and right rear sprockets have their teeth at a substantially different rotational position.

12. The motorcycle of claim 11 wherein:

the teeth of the left and right rear sprockets are substantially one half tooth out of phase.

13. The motorcycle of claim 2 wherein:

an upper segment of the left flexible band passes through a hole extending through a left side of the swingarm; and an upper segment of the right flexible band passes through a hole extending through a right side of the swingarm.

14. The motorcycle of claim 2 wherein:

the left drive sprocket and the left driven sprocket have a same size ratio as the right drive sprocket and the right driven sprocket; and the left driven sprocket has a different number of teeth than the right driven sprocket.

* * * * *